May 9, 1950

H. P. KALMUS ET AL 2,507,409

TIME MODULATED WAVE RECEIVER

Filed Jan. 24, 1947

HENRY P. KALMUS
CHALON W. CARNAHAN
INVENTORS.

BY David M. Davis

THEIR ATTORNEY

Patented May 9, 1950

2,507,409

UNITED STATES PATENT OFFICE 2,507,409

TIME MODULATED WAVE RECEIVER

Henry P. Kalmus and Chalon W. Carnahan, Oak Park, Ill., assignors to Zenith Radio Corporation, a corporation of Illinois Application January 24, 1947, Serial No. 724,190

1 Claim. (Cl. 250—20)

This invention relates to time modulated wave receivers which employ synchronized oscillators and has as its object the provision of circuits having characteristics which enhance the performance of such oscillators.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figure 1:
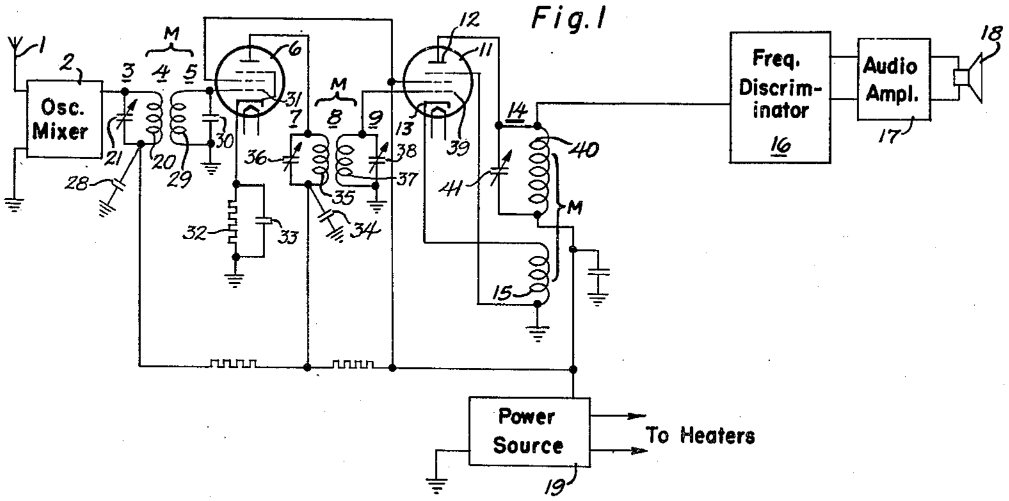
Figure 1 is a diagram partly schematic and partly in block form of a radio receiver incorporating the present invention.

In Figure 1, briefly, frequency modulated radio frequency signals intercepted by antenna 1 are converted to intermediate frequency signals by the conventional heterodyning method in oscillator-mixer 2 and are impressed on primary circuit 3 of intermediate frequency input transformer 4. Secondary circuit 5 is overcoupled magnetically to primary circuit 3 and an intermediate frequency signal appears across circuit 5. This signal is amplified in conventional fashion by intermediate frequency amplifier tube 6 and the amplified signal appears across primary circuit 7 of intermediate frequency output transformer 8. A corresponding signal appears in secondary circuit 9 which is overcoupled magnetically to primary circuit 7.

This signal is impressed on control grid 39 of oscillator tube 11 and causes the oscillator section including anode 12, cathode 13 tank circuit 14, and tickler coil 15 to oscillate in synchronism with the impressed signal. This synchronized oscillator voltage is appropriately coupled to a frequency modulation detector circuit 16 which may be of any type effective to produce audio frequency voltages corresponding to variations in the frequency of the voltage from oscillator tank circuit 14. These audio voltages are increased in amplitude in amplifier 17 and are reproduced on speaker 18. Appropriate operating potentials are obtained from power source 19.

In Figure 1, in detail, frequency modulated radio frequency signals intercepted by antenna 1 are converted to corresponding intermediate frequency signals by heterodyning in oscillator-mixer 2. These intermediate frequency signals are impressed across primary 3 of input transformer 4. Primary circuit 3 includes inductance 20 shunted by variable capacitance 21, the combination resonating at the mean intermediate frequency. Anode currents for oscillator-mixer 2 pass through inductance 20, and intermediate frequency signals are bypassed across the anode current supply by capacitance 28.

Secondary circuit 5 includes inductance 29 tuned to resonance at the same frequency as primary circuit 3 by means of variable capacitance 30. The physical spacing between inductances 20 and 29 is adjusted so that the primary and secondary tuned circuits are more than critically coupled. The condition of critical coupling exists when the resistance reflected into the primary circuit is equal to the inherent resistance of the primary circuit. When two tuned circuits are overcritically coupled the resultant primary resistance at resonance, being a combination of inherent and reflected resistance, is high and the primary current is decreased. At frequencies below resonance the reflected reactive component of impedance is inductive, whereas the inherent primary impedance is largely capacitive, so that the reflected reactance counteracts some of the inherent reactance, lowering the primary impedance and increasing the primary current. For frequencies above resonance the reflected reactance is capacitive, whereas the inherent reactance is inductive, and again some of the primary reactance is counteracted and the primary current is increased. The net result of this reflected impedance in the overcoupled tuned circuits is to decrease the primary current at resonance, because of the large reflected resistance, and to increase the primary current at frequencies off resonance where reflected reactance counteracts inherent reactance. This result is shown graphically in Figure 2. The two humps in the frequency response curve shown in Figure 2 result from the primary reactance counteraction just described. The frequency separation of these two humps can be controlled by varying the degree of overcoupling. The difference in current at resonance and at the peaks is a function of the magnitude of the secondary resistance and the degree of overcoupling.

The curve for the secondary current and, consequently, for the voltage appearing across the condenser in the secondary circuit is substantially the product of the primary current curve and the secondary resonance curve. With overcoupling the secondary curve is double peaked, the peaks having the same frequency separation as the peaks in the primary current curve. Thus, the response curve of the transformer, and of the amplifier incorporating it, is doubled peaked.

In the present embodiment of this invention the coupling between primary circuit 3 and secondary circuit 5 of transformer 4 is adjusted so that the humps in the response curve fall at the maximum deviation frequencies, $f_0+f_m$ and $f_0-f_m$, of the frequency modulated wave. The current difference between the peaks and the valley at resonance is set at approximately six decibels.

The intermediate frequency voltages developed across secondary circuit 5 are impressed on control grid 31 of amplifier tube 6. These voltages are amplified in conventional fashion and appear across the primary circuit 7 of output transformer 8. Amplifier tube 6 is cathode biased by means of resistor 32 shunted by bypass condenser 33. Screen, heater and anode operating potentials for tube 6 are supplied from power source 19. Condenser 34 bypasses high frequency currents across power source 19.

Primary circuit 7 of output transformer 8 includes inductance 35 resonated at the mean intermediate frequency by variable capacitance 36. The intermediate frequency voltages impressed on primary circuit 7 induce currents in secondary circuit 9, which includes inductance 37 shunted by variable capacitance 38, the combination being resonant at the same frequency as primary circuit 7. Primary circuit 7 and secondary circuit 9 are overcoupled to the same degree as are primary circuit 3 and secondary circuit 5 of input transformer 4. The frequency response characteristic curve for output transformer 8 is like that shown in Figure 2 and is as nearly as possible identical with that for output transformer 4. The desired overall response characteristic for the intermediate frequency amplifier is thus obtained.

The intermediate frequency voltages appearing across secondary circuit 9 are impressed on control grid 39 of synchronized oscillator tube 11. Radio frequency oscillations are generated in tank circuit 14, by reason of magnetic coupling between tank circuit 14, which includes inductance 40 resonated by variable capacitance 41, and cathode tickler coil 15. These oscillations are at a frequency which bears a harmonic relationship to the mean intermediate frequency. In the present application the term "harmonic" is meant to include multiples and sub-multiples of the fundamental frequency, as well as the fundamental itself. In the present embodiment the oscillator free-running frequency is a sub-multiple of the mean intermediate frequency. The reasons for so operating the oscillator are: (1) the load placed on the intermediate frequency amplifier by the oscillator is thus reduced, and (2) problems of overall regeneration are minimized. The voltage at the intermediate frequency required to synchronize the oscillator running at a sub-harmonic of the intermediate frequency is greater than that required if both are operated at the same frequency. In other words, the synchronization sensitivity of the oscillator is decreased by sub-harmonic operation, but the advantages of such operation outweigh the disadvantages.

Current for anode 12 is supplied from power source 19 through inductance 40 of tank circuit 14. Appropriate screen and heater operating potentials are also supplied from power source 19.

The mechanism by which the intermediate frequency signal impressed on control grid 39 can synchronize the frequency of oscillation of the voltage in tank circuit 14 is well known and is described in an article written by the present inventors and appearing in "Electronics" for August 1944. Briefly, currents in tank circuit 14 corresponding to the intermediate frequency signal impressed on control grid 39 add vectorially with oscillator currents generated therein to produce a resultant current shifted in phase. Thus, the angular velocity of the oscillation vector during the conduction period may be decreased or increased, depending on whether the phase of the plate current produced by the synchronizing voltage is lagging or leading the phase of the free-running oscillator current. Synchronization occurs only when the oscillator current vector rotates through 360 electrical degrees in exactly one cycle of the synchronizing voltage. The condition for stable synchronization is such that the gain or loss in relative phase angle between the oscillator current vector and the synchronization current vector during the amplification period shall exactly balance the loss or gain in relative phase angle during the cut-off period.

The phenomenon of stable synchronization is thus due to the fact that the oscillation vector can slip in relation to the synchronizing vector until stable phase and amplitude conditions are reached. If the synchronizing vector varies in angular velocity but is always of sufficient amplitude, the oscillator will adjust itself almost instantaneously to every change in the frequency of the synchronizing voltage.

Synchronization with an injected signal whose frequency is a multiple of the free-running frequency can be explained in a similar manner since during the active period the multiple-frequency synchronizing wave is practically equivalent to a synchronizing wave with the frequency of the oscillator but with an amplitude which is a multiple of that of the equivalent oscillator-frequency synchronizing wave.

Synchronization sensitivity may be defined roughly as the amplitude of the injected voltage required to synchronize the oscillator over a given frequency range of the synchronizing voltage for a given oscillator frequency and amplitude. Amplitude of the voltage required to synchronize an oscillator varies directly as the deviation of the frequency of the synchronizing voltage from the free-running frequency of the oscillator. With the conventional amplifier circuits preceding the synchronized oscillator, the amplitude of the voltage falls off on either side of the mean intermediate frequency because of the singly peaked frequency response characteristic of those amplifier stages. In order to be sure of satisfactory synchronization of the oscillator at the maximum deviation frequencies of a frequency modulated wave it is necessary, with the ordinary singly peaked amplifier circuits, to develop a synchronizing voltage at the mean intermediate frequency which is considerably greater than that actually required for synchronization at that frequency, the amplitude of the synchronizing voltage at the maximum deviation frequencies being then just adequate to synchronize the oscillator. The disadvantage which arises under these operating conditions is that the sub-harmonic frequency oscillations of the synchronized oscillator are suppressed if the synchronizing signal rises to the same order of magnitude as the oscillator voltage. The distortion caused by such suppression of the sub-harmonic at the mean intermediate frequency where the synchronizing signal reaches its maximum amplitude has an appearance similar to that caused by insufficient synchronizing signal. The distortion effect appears to be due to upper bend saturation in the oscillator tube characteristic, so that too much injected voltage lowers the effective transconductance of the tube to the point where the oscillations at the sub-harmonic frequency can no longer be sustained. The effect is analogous to overloading in the intermediate frequency amplifier stages of an amplitude modulation receiver, but the resulting audio distortion is much worse and cannot be tolerated.

Figure 2:
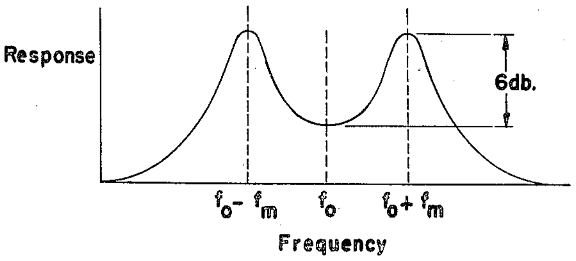
Figure 2 is a characteristic curve for a portion of the circuit of Figure 1.

As was discussed earlier, input transformer 4 and output transformer 8 are overcoupled so that the frequency response characteristics of the intermediate frequency amplifier stage including amplifier tube 6 and transformers 4 and 8 is shaped like the curve shown in Figure 2. At the frequencies of maximum deviation the synchronizing voltage impressed on control grid 39 of synchronized oscillator tube 11 is greater than that appearing at the mean frequency. The demand of the synchronized oscillator for greater synchronizing voltage at frequencies off the mean frequency is thus met, and the synchronizing voltage at the mean frequency is kept sufficiently low so that suppression of the sub-harmonic oscillations in tank circuit 14 is prevented. The synchronization sensitivity of the synchronized oscillator is thus effectively increased with the result that the overall sensitivity of the frequency modulation receiver is also increased.

It is possible to produce this desired doubly peaked amplifier characteristic curve by incorporating a pair of filter circuits having singly peaked frequency response characteristics, and staggering the frequencies at which such peaks occur. One circuit is adjusted to give minimum attenuation at the minimum frequency $f_0 - f_m$ reached during modulation and the other circuit is adjusted to give minimum attenuation at the maximum frequency $f_0 + f_m$ reached during modulation. The two filter circuits are usually coupled to each other through a stage of vacuum tube amplification. The circuit arrangement for such an alternative embodiment, might be, for example, as shown in Figure 1, filter circuits 4 and 8 being coupled through an amplifier 6. In such an alternative embodiment, windings 3 and 5 of transformer 4 and windings 7 and 9 of transformer 8 are critically or less than critically coupled, filter 4 being tuned to $f_0 - f_m$ and filter 8 being tuned to $f_0 + f_m$.

The synchronized oscillator output voltage is coupled in appropriate fashion to a frequency discriminator circuit which may be any one of a number of such devices, as for example a space charge discriminator or one of the well known Seeley type. The audio voltage obtained from the output of this frequency discriminator may be appropriately amplified in amplifier 17 and then impressed on speaker 18.

Anode current for synchronized oscillator tube 11 is supplied from power source 19 through inductance 40. The appropriate screen and heater operating potentials are also obtained from this source. Similarly, the operating potentials for discriminator 16 and audio amplifier 17 are obtained from power source 19.

Figure 3:
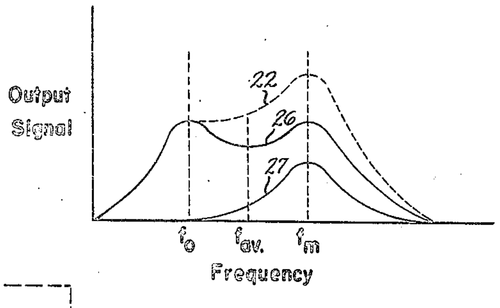
Figure 3 is the characteristic curve desired in a particular application of the present invention.

The present invention is also applicable to single side band communication systems where either there is a continuous spectrum from the carrier frequency to the maximum modulation frequency or the transmitter frequency is time modulated abruptly from a first frequency to a second frequency. For such operation the most desirable amplification characteristic curve is one like curve 22 in Figure 3. It is apparent from that curve that the wave attenuation at $f_0$, the harmonic of the oscillator free-running frequency, is greater than at the maximum modulation frequency $f_m$. The synchronization requirements of the oscillator are thus satisfied.

Figure 4:
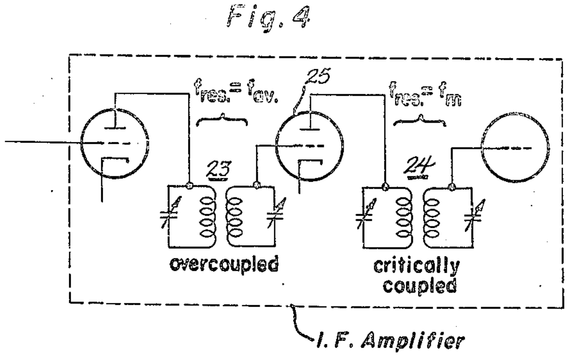
Figure 4 is a modified circuit for a portion of the receiver of Figure 1, whereby such characteristic curve can be obtained.

A simplified representation of a circuit which, when substituted for the intermediate frequency amplifier stage of Figure 1, will provide the response characteristic desired, is shown in Figure 4. Transformer 23 may correspond to transformer 4 of Figure 1, except that transformer 23 has its overcoupled primary and secondary circuits tuned to a frequency $f_{av}$ lying intermediate $f_0$, the harmonic of the free-running oscillator frequency, and $f_m$, the maximum frequency of the time modulated wave. The degree of overcoupling is adjusted to cause the two peaks in the transformer response curve to fall at $f_0$ and $f_m$, as shown by curve 26 of Figure 3. Amplifier tube 25 and transformer 24 of Figure 4 may correspond to tube 6 and transformer 8 of Figure 1, respectively. However, the tuned primary and secondary circuits of transformer 24 are coupled critically or less than critically, instead of being overcoupled as are the tuned windings of transformer 8. As is indicated by curve 27 of Figure 3, the commont resonant frequency of the primary and secondary circuits of transformer 24 is adjusted to be equal to $f_m$, the maximum deviation frequency resulting from modulation. By cascading tuned transformers 23 and 24, the overall amplifier response curve can be made to correspond to curve 22 in Figure 3 and the synchronization requirements of the oscillator will be satisfied.

It is within the scope of this invention to utilize a single tuned circuit in place of the critically coupled double tuned circuit including transformer 24.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

We claim:

A wave-signal translating system for translating a frequency-modulated carrier wave having a predetermined center frequency and a modulation range bounded by predetermined maximum-deviation frequencies comprising: a double-tuned transformer tuned to said center frequency and having over-coupled primary and secondary windings with peak response substantially at said maximum-deviation frequencies; a synchronized oscillator, having a free-running frequency harmonically related to said center frequency and constructed and arranged to synchronize only with signals of frequencies within said range, coupled to said transformer for producing a frequency-modulated output signal comprising only those modulation components contained in said frequency-modulated carrier wave and for rejecting signals appearing on adjacent channels; and a frequency detector coupled to said oscillator for demodulating said output signal.

HENRY P. KALMUS.
CHALON W. CARNAHAN.

REFERENCES CITED

The following references are of record in the file of this patent:

UNITED STATES PATENTS

| Number | Name | Date |
|---|---|---|
| 2,194,566 | Mountjoy | Mar. 26, 1940 |
| 2,245,134 | Klaiber | June 10, 1941 |
| 2,356,201 | Beers | Aug. 22, 1944 |
| 2,369,621 | Travis | Feb. 13, 1945 |
| 2,379,721 | Koch | July 3, 1945 |

OTHER REFERENCES

Beers, A Frequency Dividing Locked in Oscillator Frequency Modulation Receiver, Proc. I. R. E. (Dec. 1944), vol. 32, No. 12, pp. 730–737.